(12) United States Patent
Da Costa

(10) Patent No.: US 7,438,494 B1
(45) Date of Patent: Oct. 21, 2008

(54) TOOL COUPLER/ADAPTOR

(76) Inventor: Tony Da Costa, 7340 Walnut Canyon Rd., Moorpark, CA (US) 93021

( * ) Notice: Subject to any disclaimer, the term of this patent is extended or adjusted under 35 U.S.C. 154(b) by 0 days.

(21) Appl. No.: 11/880,740

(22) Filed: Jul. 23, 2007

(51) Int. Cl.
 B25G 3/18 (2006.01)
 F16B 21/00 (2006.01)
 F16D 1/00 (2006.01)
(52) U.S. Cl. .......... 403/321; 403/322.1; 403/322.4; 403/324; 37/444; 37/468
(58) Field of Classification Search ........... 403/321, 403/322.1, 322.4, 324; 172/272, 273; 37/379, 37/403, 444, 468; 414/723
 See application file for complete search history.

(56) References Cited

U.S. PATENT DOCUMENTS

| | | | | |
|---|---|---|---|---|
| 3,874,533 A | * | 4/1975 | Montgomery et al. | 414/723 |
| 4,318,662 A | * | 3/1982 | Erickson et al. | 414/686 |
| 5,382,110 A | * | 1/1995 | Perotto et al. | 403/322.3 |
| 5,546,683 A | * | 8/1996 | Clark | 37/468 |
| 5,634,735 A | * | 6/1997 | Horton et al. | 403/322.1 |
| 5,966,850 A | * | 10/1999 | Horton | 37/468 |
| 6,154,989 A | * | 12/2000 | Kaczmarski et al. | 37/444 |
| D458,942 S | * | 6/2002 | Balemi | D15/28 |
| 6,431,785 B1 | * | 8/2002 | Melander | 403/322.1 |
| 6,508,616 B2 | * | 1/2003 | Hung | 414/723 |
| 6,609,587 B1 | * | 8/2003 | Smith et al. | 180/418 |
| 7,267,521 B1 | * | 9/2007 | Smith | 414/723 |

* cited by examiner

Primary Examiner—Greg Binda
Assistant Examiner—Nahid Amiri
(74) Attorney, Agent, or Firm—Patrick F. Bright; Wagner, Anderson & Bright, LLP

(57) ABSTRACT

A coupling apparatus, or adaptor, releasably secures a tool such as a bucket to the linkage of a tractor such as a backhoe in a direction opposite the normal, rear-facing direction.

2 Claims, 7 Drawing Sheets

TOOL COUPLER/ADAPTOR

FIELD OF THE INVENTION

This invention relates to a coupler apparatus, or adaptor, for attaching a tractor/backhoe/excavator dipper assembly to a tool such as a bucket, with the bucket positioned to dig in the direction away from the tractor/backhoe/excavator and its operator.

BACKGROUND OF THE INVENTION

The Wain-Roy quick-change coupling tool, disclosed in U.S. Pat. No. 5,634,735, is used on many different backhoes and excavators. This patent is hereby incorporated herein by reference.

Often when operating a backhoe/excavator/tractor with this tool, obstructions such as concrete footings and other fixed objects that have to be dug under are encountered. Because of the direction of the backhoe/excavator/ tractor digging bucket, an operator only has one direction to dig, and that is toward himself. Digging to be done behind the bucket must be done manually.

The adaptor is a quick change device that reverses the bucket, and therefore the direction of digging with the bucket, without modifying the bucket or the dipper assembly of the backhoe/excavator, and facilitates digging under objects such as streets, sidewalks, footings, fences and other utilities, eliminating much manual labor. Removing the adaptor quickly changes the bucket back to its normal digging direction.

SUMMARY OF THE INVENTION

An adaptor for connection on one side to the end of a dipper assembly of a backhoe/excavator, and for connection on the opposite side to a backhoe/excavator bucket to position the bucket facing away from the backhoe/excavator, includes a first frame having two side panels and an end panel that joins the two side panels in a spaced relationship. Near the upper edge of the first frame's end panel is at least one opening that is complementary in size and shape to an opening near the edge of the distal end of the dipper assembly. These two openings abut/face one another when the adaptor is properly placed on the distal end of the dipper assembly, and receive an anchoring device, e.g., a pin or bolt that passes through the two openings and connects the adaptor to the distal end of the dipper assembly. Near the top of, and extending between the two side panels of the first frame, and spaced from the end panel, is a bar that has a generally round surface, and includes flat surfaces at the top and bottom of the bar.

The adaptor may include a second frame with two side panels, and first and second end panels connecting the two side panels in a spaced-apart relationship. Connected to the bottom of the first frame is a hook that extends downwardly toward the second end panel of the second frame. In the first end panel of the second frame is at least one opening that is complementary in size and shape to an opening near the upper edge of a bucket. These two openings abut/face one another when the adaptor is properly placed on the end of the bucket, and receive an anchoring device, e.g., a pin or a bolt/nut combination that passes through the two openings and connects the adaptor to the bucket. Alternatively, the adaptor may comprise one frame, with the features of the first and second frame described here on that frame.

BRIEF DESCRIPTION OF THE DRAWINGS

The invention is more readily understood from the following detailed description when read in conjunction with the appended, exemplary drawings, in which.

DETAILED DESCRIPTION OF THE DRAWINGS

Figure 1:
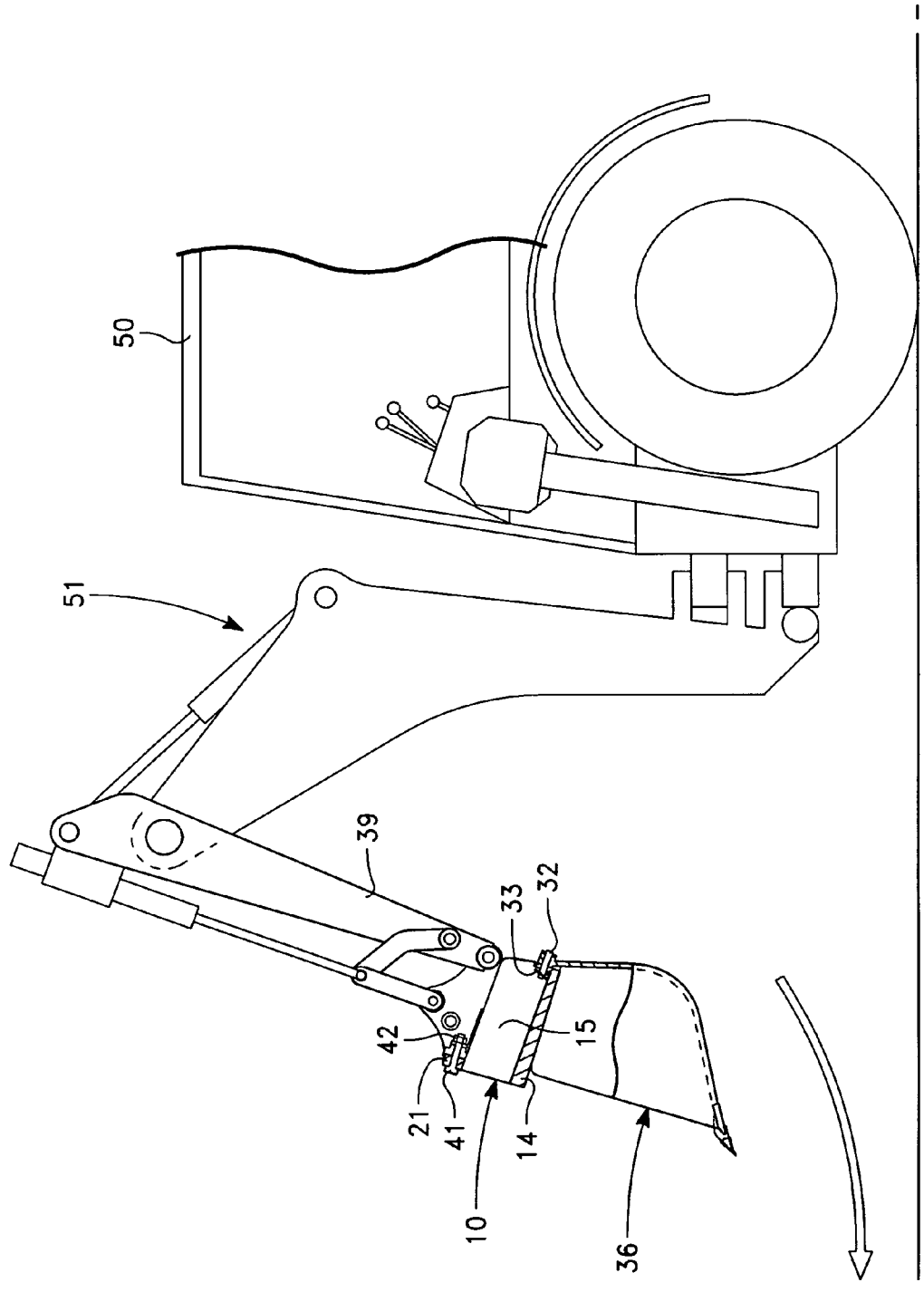
FIG. 1 is a side elevation view of a backhoe/excavator that includes an adaptor embodiment connecting a bucket to the end of the dipper assembly of the backhoe/excavator.
Figure 2:
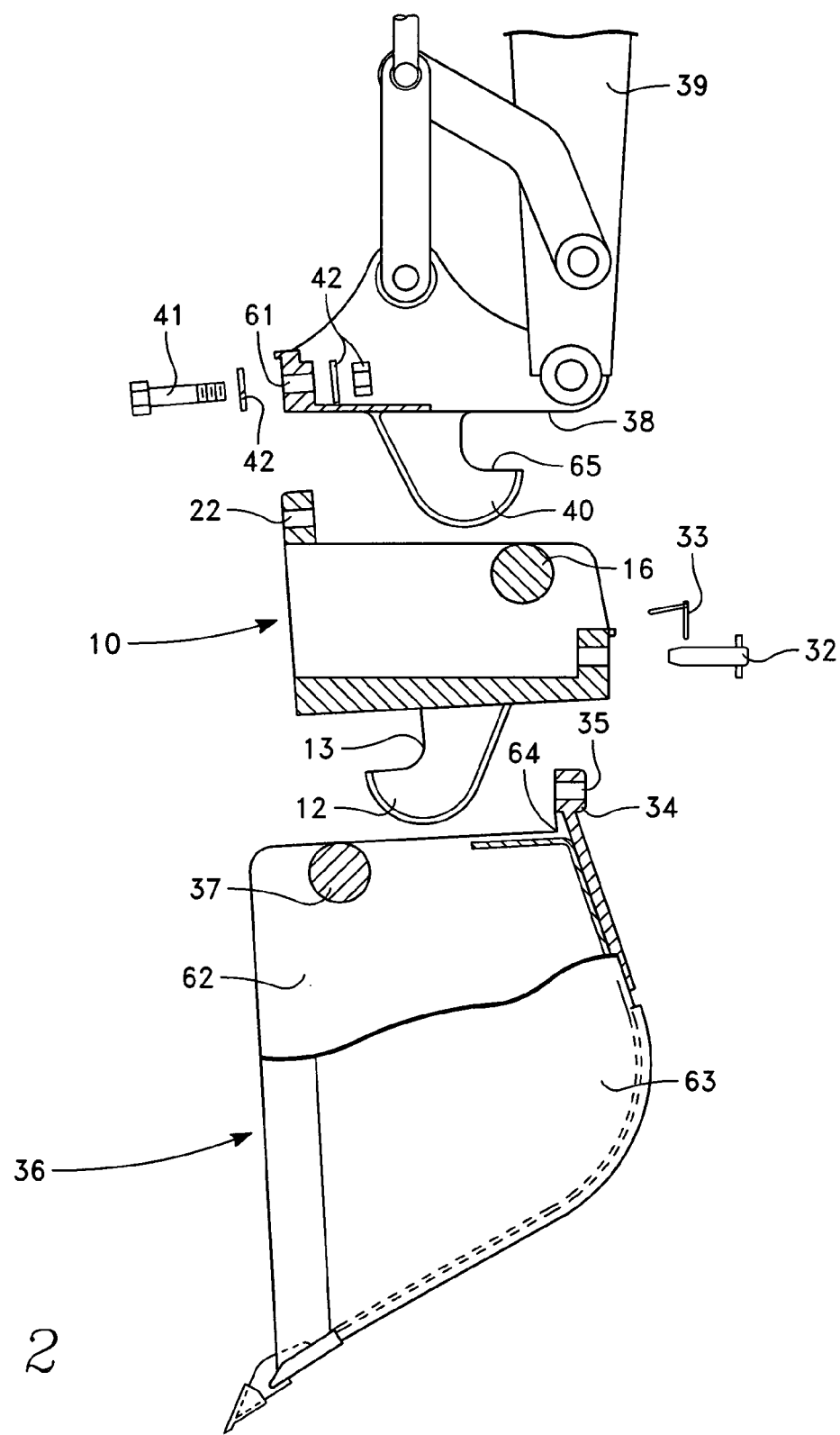
FIG. 2 shows a side elevation view of the end of the dipper assembly, adaptor, and bucket, shown in FIG. 1, separated from one another.
Figure 4:
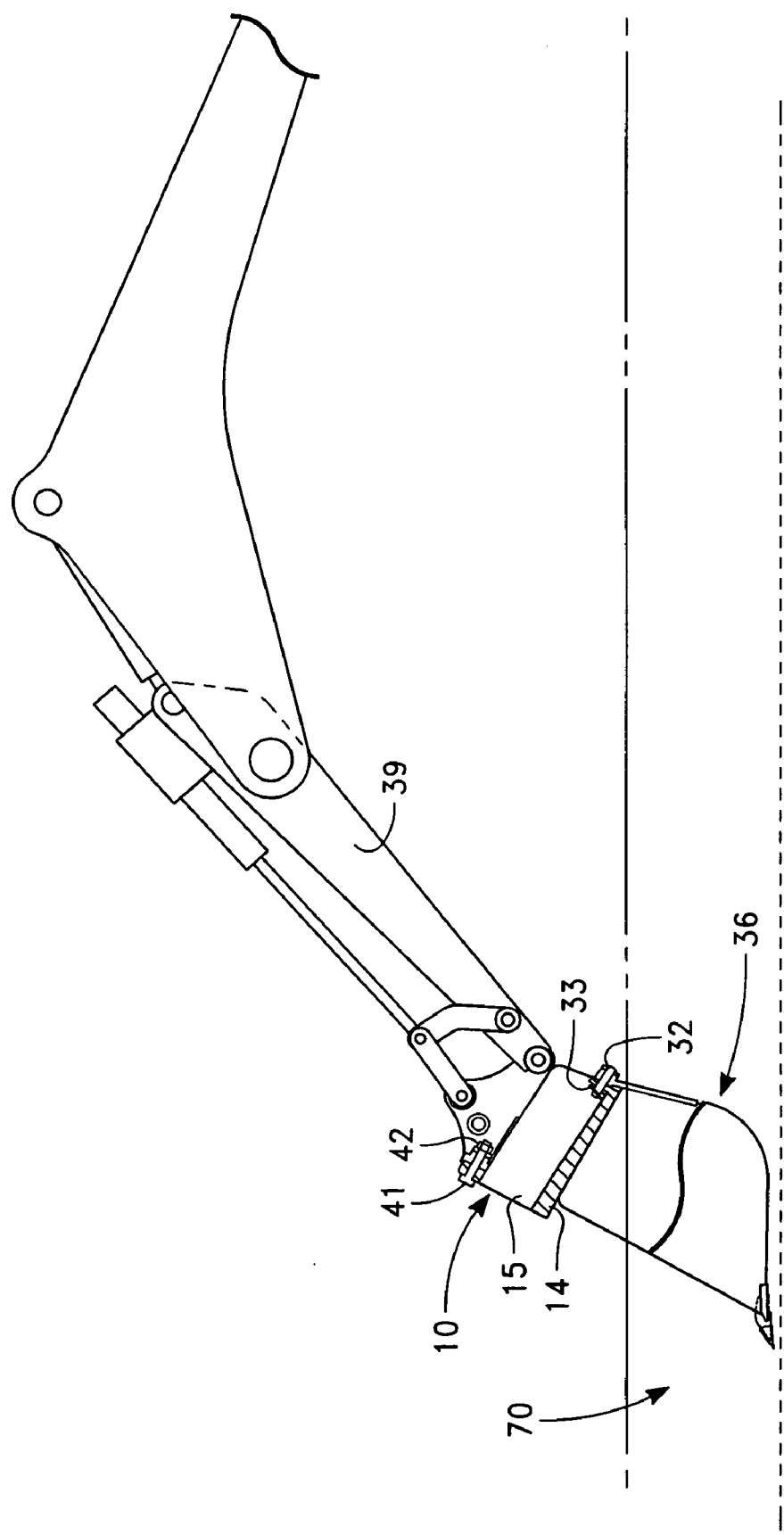
FIG. 4 shows how the backhoe/excavator that includes an embodiment of the adaptor connecting a bucket to the end of the dipper assembly of the backhoe/excavator, as shown in FIG. 1, can be used to dig in a direction away from the backhoe/excavator.

FIGS. 1, 2 and 4, and show a backhoe/excavator 50 that includes an embodiment of the adaptor 10 connecting a bucket 36 to dipper assembly 39 of backhoe/excavator 50. Adaptor 10 is releasably connected to bucket 36 with anchoring pin 32 and locking pin 33, and is releasably connected to dipper assembly 39 with anchoring bolt 41 and nut 42. The anchoring pin passes through abutting/facing openings 35/20 on the bucket/adaptor, and the anchoring bolt/nut 41/42 passes through abutting/facing openings 22/61 on the adaptor/dipper assembly. FIG. 4 shows that the bucket/adaptor/dipper assembly can dig in the direction away from backhoe/excavator 50 in, for example, ditch 70.

Figure 3:
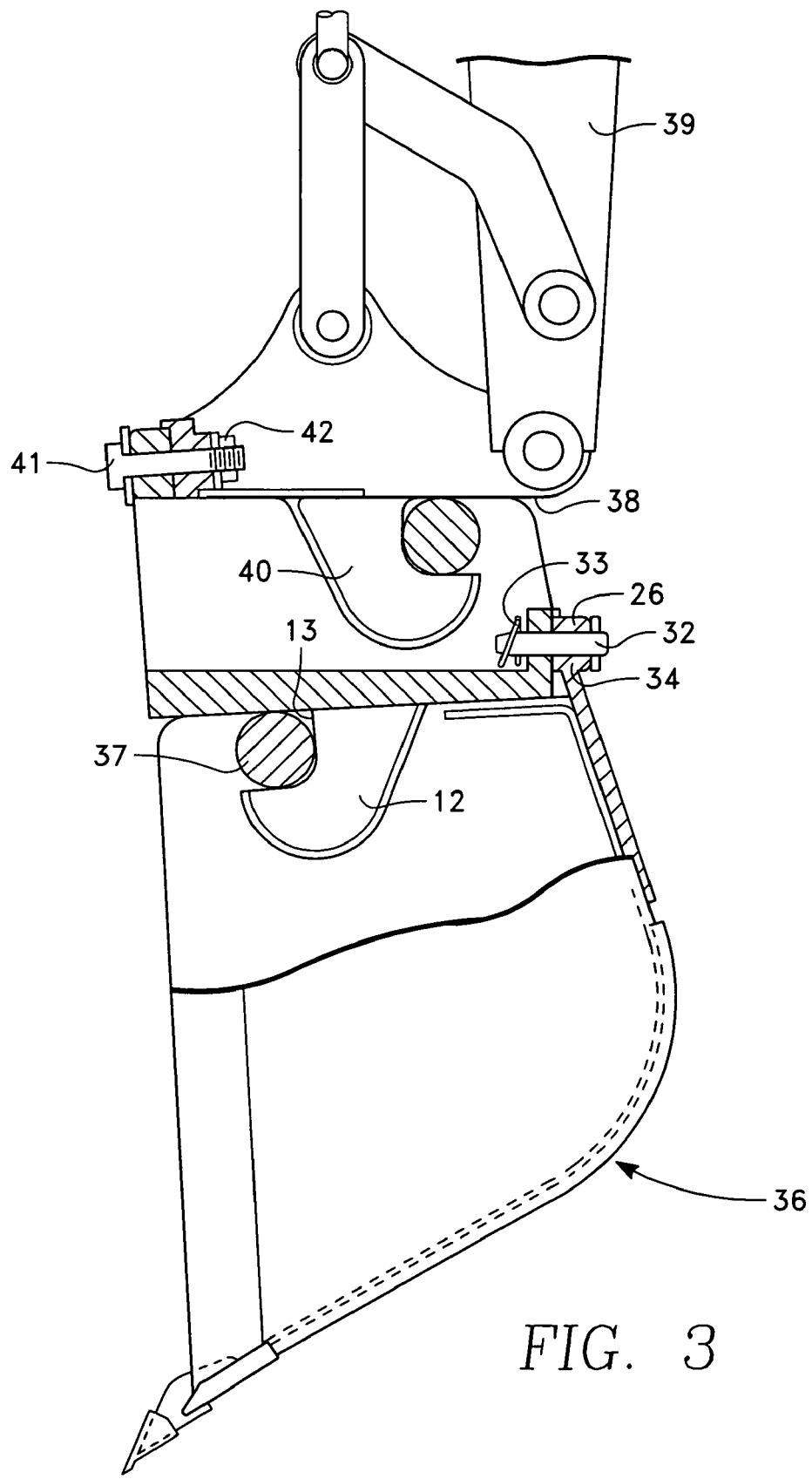
FIG. 3 shows a side elevation view of the end of the dipper assembly, adaptor, and bucket, shown in FIGS. 1 and 2, connected to one another.

FIGS. 2 and 3 show dipper assembly 39, adaptor 10, and bucket 36 separated from one another. Bucket 36 includes transverse bar 37 extending between bucket walls 62 and 63, and, at its upper rear edge 64, upstanding member 34 with through hole 35. Adaptor 10 includes transversely-extending bar 16 which engages and rests on surface 65 of hook 40 on dipper assembly 39. Adaptor 10 also includes downwardly-extending hook 12 with surface 13 that engages bar 37 inside bucket 36.

Figure 5:
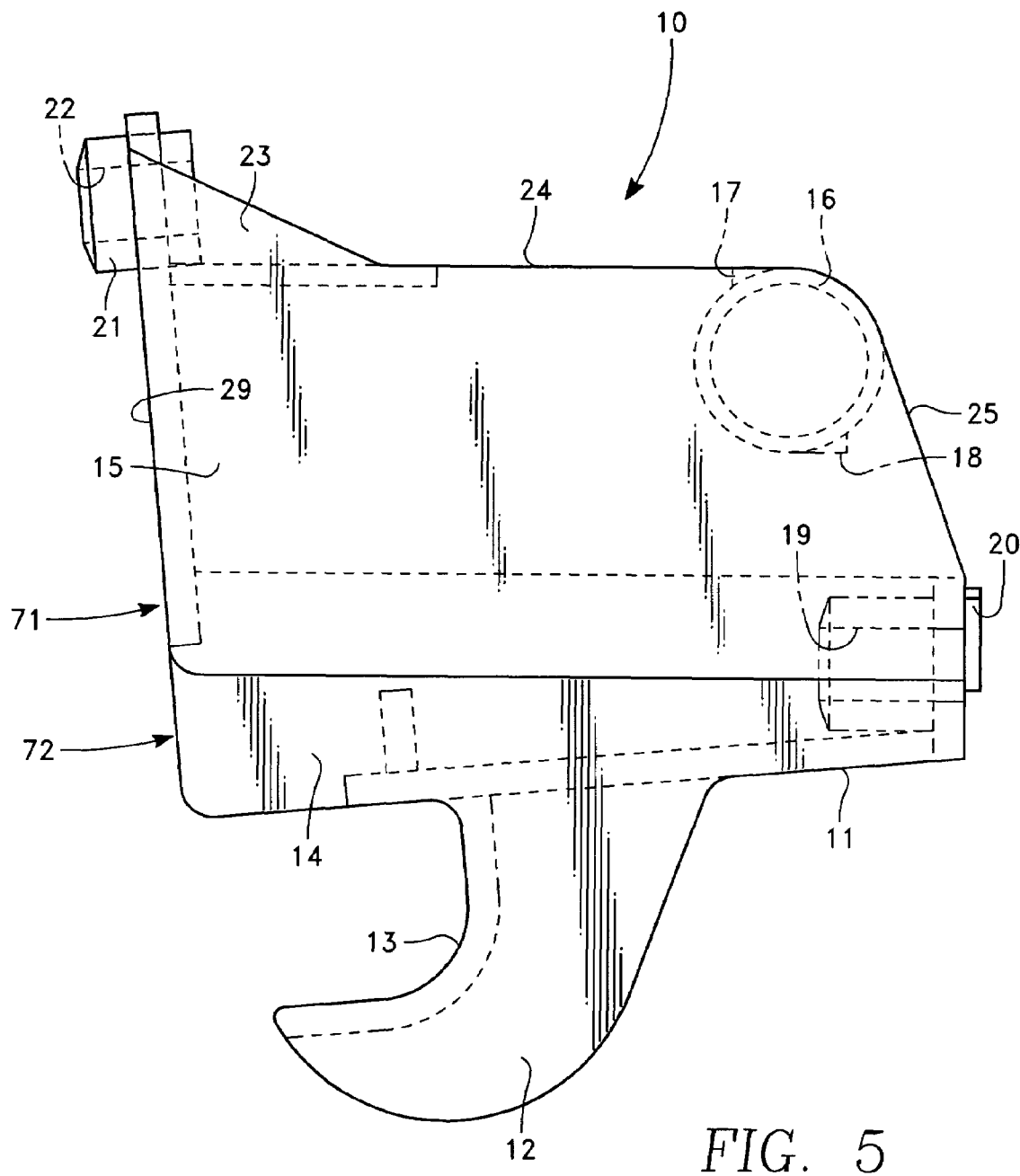
FIG. 5 is a side elevation view of the adaptor embodiment shown in FIGS. 1 to 4.
Figure 6:
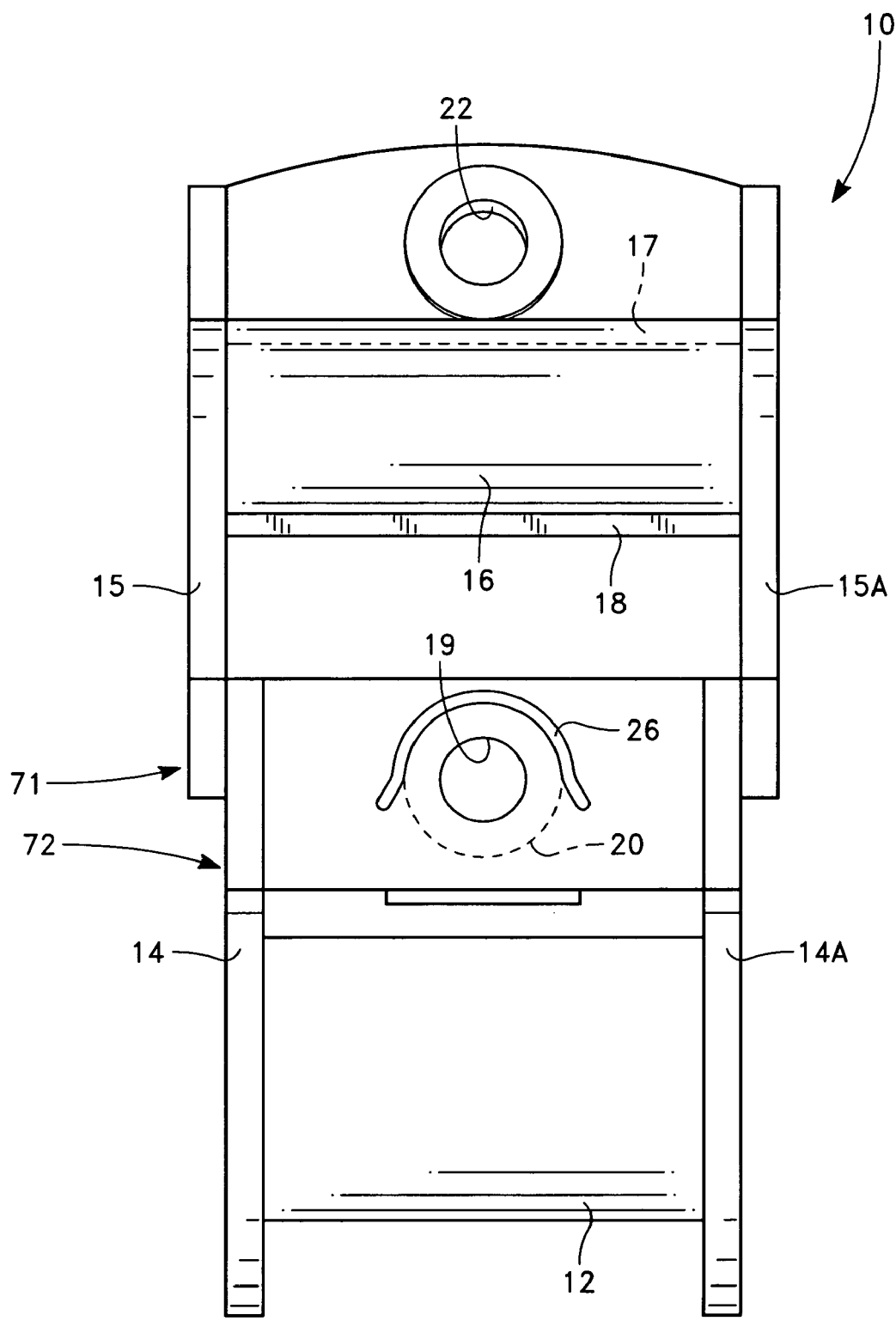
FIG. 6 is an end elevation view of the adaptor embodiment shown in FIGS. 1 to 5.
Figure 7:
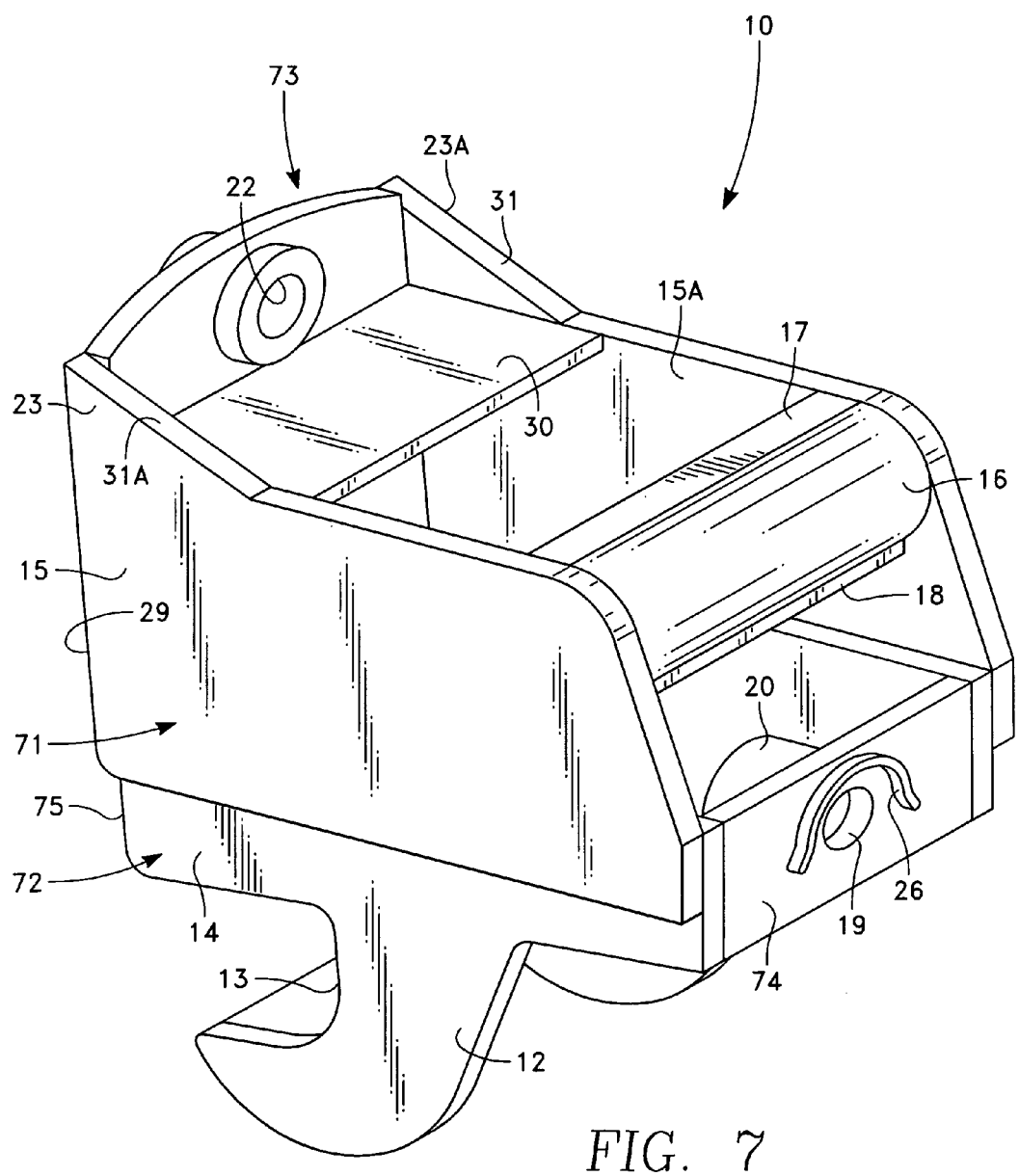
FIG. 7 is a perspective view of the adaptor embodiment shown in FIGS. 1 to 6.

FIGS. 5 to 7 show side elevation, end, and perspective views of adaptor embodiment 10. Adaptor 10 includes frame 71 and frame 72 connected to one another along the side walls of these two frames. Frame 71 includes spaced-apart sidewalls 15 and 15A, including inclined portions 23 and 23A, that are connected to one another through end wall 29 and transverse wall 30. Near the top 73 of end wall 29 is opening 22. Extending transversely between side walls 15 and 15A is bar 16 with a generally rounded profile, and with top and bottom flat surfaces 17 and 18. Joined to frame 71 is frame 72, which includes spaced-apart sidewalls 14 and 14A, joined to one another by end walls 74 and 75. Hook 12 is connected to, and here is part of side walls 14 and 14A. Hook 12 points toward end wall 75. End wall 74 includes tubular member 20 with opening 19, and, atop opening 19, curved stop member 26, which is attached to end wall 74.

The invention claimed is:

1. An adaptor for releasably connecting a bucket to the dipper assembly of a backhoe/excavator comprises: a first frame having two side panels and an end panel that joins the two side panels in a spaced, parallel relationship, said end panel including, near the upper edge of said adaptor's end panel, at least one first opening that passes through said end panel parallel to said side panels, and is complementary in size and shape to an opening near the edge of the distal end of said dipper assembly, whereby said two openings abut/face one another when the adaptor is properly placed on the distal end of said dipper assembly, and receive an anchoring device that passes through the two openings and connects said adaptor to the distal end of said dipper assembly; near the top of, and extending between said two side panels of said first frame, near to said first opening, and spaced from said end panel, a bar; said adaptor further comprising a second frame with two side panels, and first and second end panels connecting said the two side panels in a spaced apart, parallel relationship, and connected to the bottom of said second frame, a hook that is near to and extends downwardly toward the second end panel of said second frame, and, in the first end panel of said second frame, at least one second opening that passes through said first end panel parallel to said side panels, and is complementary in size and shape to an opening near the upper edge of said bucket, whereby the bucket opening and the opening in said first end panel abut/face one another when the adaptor is properly placed on the end of the bucket, and receive an anchoring pin that passes through said two openings and connects said adaptor to said bucket.

2. An adaptor for releasably connecting a bucket to the dipper assembly of a backhoe/excavator comprises: a frame having two side panels and two end panels in a spaced relationship, one of said end panels including, near the upper edge of said end panel, at least one opening that passes through one of said end panels parallel to said side panels, and is complementary in size and shape to an opening near the edge of the distal end of said dipper assembly, whereby said two openings abut/face one another when the adaptor is properly placed on the distal end of said dipper assembly, and receive an anchoring device that passes through the two openings and connects said adaptor to the distal end of said dipper assembly; near the top of, and extending between said two side panels of said frame, and near to and spaced from said end panel, a bar; and, connected to the bottom of said frame, a hook that is near to, and extends downwardly toward the second end panel of said frame, and, in the end panel of said frame, at least one opening that is parallel to, and is complementary in size and shape to an opening near the upper edge of said bucket, whereby the bucket opening and the opening in said first end panel abut/face one another when the adaptor is properly placed on the end of the bucket, and receive an anchoring pin that passes through said two openings and connects said adaptor to said bucket.

* * * * *